(12) United States Patent
Ulbrich (10) Patent No.: US 6,430,828 B1
(45) Date of Patent: Aug. 13, 2002

(54) COORDINATE POSITIONING APPARATUS WITH INDEXABLE STYLUS, COMPONENTS THEREOF, AND METHOD OF USING IT

(75) Inventor: Klaus Ulbrich, Flanders, NJ (US)

(73) Assignee: Electronic Measuring Devices, Inc., Budd Lake, NJ (US)

( * ) Notice: Subject to any disclaimer, the term of this patent is extended or adjusted under 35 U.S.C. 154(b) by 0 days.

(21) Appl. No.: 09/199,190

(22) Filed: Nov. 25, 1998

Related U.S. Application Data

(60) Provisional application No. 60/082,131, filed on Apr. 17, 1998.

(51) Int. Cl.$^7$ .......................... G01B 5/004; G01B 5/008
(52) U.S. Cl. .......................... 33/503; 33/558.3; 33/560; 33/572
(58) Field of Search .......................... 33/503, 502, 504, 33/505, 557, DIG. 1, 501.09, 501.1, 501.3, 556, 558.2, 558.3, 559, 560, 572, 558, 561; 248/677, 188.1, 558; 702/150–153; 361/144, 145; 439/38–40

(56) References Cited

U.S. PATENT DOCUMENTS

| | | | |
|---|---|---|---|
| 3,111,607 A | 11/1963 | Storch | |
| 3,389,358 A | 6/1968 | Tubbs | |
| 3,783,344 A | 1/1974 | Ono et al. | |
| 4,168,576 A | 9/1979 | McMurtry | |
| 4,313,263 A | 2/1982 | McMurtry | |
| 4,349,946 A | * 9/1982 | McMurtry | 29/57 |
| 4,382,215 A | 5/1983 | Barlow et al. | |
| 4,554,610 A | 11/1985 | Metz et al. | |
| 4,571,847 A | 2/1986 | McMurtry | |
| 4,631,834 A | * 12/1986 | Hayashi et al. | 33/503 |
| 4,637,119 A | * 1/1987 | Schneider et al. | 483/69 |
| 4,649,623 A | 3/1987 | Schneider et al. | |
| 4,651,405 A | * 3/1987 | McMurtry | 483/10 |
| 4,801,911 A | 1/1989 | Batts | |
| 4,956,625 A | 9/1990 | Cardone et al. | |
| 4,962,591 A | * 10/1990 | Zeller et al. | 33/502 |
| 4,997,287 A | * 3/1991 | Tittl | 374/141 |
| 5,011,297 A | * 4/1991 | Tittl | 374/141 |

(List continued on next page.)

Primary Examiner—Diego Gutierrez
Assistant Examiner—R. Alexander Smith
(74) Attorney, Agent, or Firm—Smith, Gambrell & Russell, LLP (57) ABSTRACT

A stylus is supported by an upper coupling member which is supported by a lower coupling member which is supported by a probe which is movably supported by a rail of a coordinate positioning machine. The coupling members are held together by a permanent magnet, and their relative positioning is established by first and second sets of positioning elements provided on the first and second coupling members respectively. The sets of positioning elements are mutually engagable in a plurality of angular orientations about the axis of the coupling to provide a plurality of angularly indexed positions at which the lower coupling member has stable and repeatable positions relative to the upper coupling member. The coupling is carried to the indexing dock where a carrier engages the lower coupling member, and the lower coupling member is released from the upper coupling member by energizing an electromagnet which repels the coupling members apart. The indexing dock rotates the lower coupling member about its axis to change its angular orientation of the lower coupling member relative to the upper coupling member. The stylus is connected to a stylus mount on the lower coupling member, and the stylus mount has a plurality of stylus-receiving mounting holes which have axes extending in different directions from the axis of the stylus mount and have different inclinations relative to the axis of the stylus mount. A plurality of lower coupling members can interchangeably be mounted on the upper coupling member. When not in use, the lower coupling members are held in storage docks which accept their lower coupling members regardless of their angular orientation about the coupling axes.

33 Claims, 8 Drawing Sheets

U.S. PATENT DOCUMENTS

| | | |
|---|---|---|
| 5,028,901 A | 7/1991 | Enderle et al. |
| 5,041,806 A | 8/1991 | Enderle et al. |
| 5,185,936 A | 2/1993 | McMurtry |
| 5,323,540 A | 6/1994 | McMurtry et al. |
| 5,327,657 A * | 7/1994 | Hajdukiewicz et al. ....... 33/503 |
| 5,339,535 A | 8/1994 | McMurtry et al. |
| 5,404,649 A | 4/1995 | Hajdukiewicz et al. |
| 5,524,354 A * | 6/1996 | Bartzke et al. ................ 33/561 |
| 5,665,896 A | 9/1997 | McMurtry |
| 5,675,902 A | 10/1997 | Chase |
| 5,879,127 A * | 3/1999 | Grunes et al. ........... 414/744.6 |
| 5,918,378 A * | 7/1999 | McMurtry et al. ............ 33/556 |
| 5,996,239 A * | 12/1999 | Ohnheiser .................... 33/503 |

\* cited by examiner

COORDINATE POSITIONING APPARATUS WITH INDEXABLE STYLUS, COMPONENTS THEREOF, AND METHOD OF USING IT

REFERENCE TO RELATED APPLICATIONS

This is a continuation-in-part of United States provisional application 60/082,131, filed Apr. 17, 1998.

BACKGROUND OF THE INVENTION

This invention relates to improvements in coordinate positioning apparatus and particularly to such an apparatus with an indexable and/or releasable stylus.

A coordinate positioning machine includes a support for a workpiece, a stylus or other sensing device (rangefinder, vision probe, etc.) for sensing points on a workpiece, and an assembly which supports the workpiece sensing device and permits it to move relative to the workpiece along coordinate axes which, in most cases, are a horizontal x-axis, a horizontal y-axis and a vertical z-axis. Position-indicating scales are provided to indicate the position of the machine head along the coordinate axes. (The term "stylus" is used in this specification without the intention of excluding other devices for sensing points on a workpiece.)

In early coordinate measuring machines, sometimes referred to as "hard probe machines" a stylus was rigidly connected to the head of the machine. A subsequent development was the touch-trigger probe which is mounted on the head and generates a digital signal when the stylus moves due to contact with the workpiece. Still another type of probe is an analog probe which provides signals indicating the magnitude of displacements which occur between the stylus and the head of the machine. A probe of the latter type which provides such signals along three mutually perpendicular axes is disclosed in U.S. Pat. No. 5,222,034 issued to the present inventor on Jun. 22, 1993, the entirety of which is incorporated into this specification by reference.

It is customary in the metrology field to provide coordinate measuring machines with a number of interchangeable styli which are selected and used depending upon the nature of the task at hand. In some situations, the styli are mounted on the head by threaded connections. Magnetically retained styli have also been utilized, wherein two releasable coupling members are held together magnetically.

Indexable probes are known in the art as exemplified by U.S. Pat. Nos. 4,313,263, 4,571,847, and 5,185,936. In each of these systems, a probe is supported by an indexing mechanism, and a stylus is supported by the probe. In U.S. Pat. Nos. 4,313,263 and 4,571,847, indexing is achieved by engaging the stylus with a stationary object and moving the probe so that an indexable (but not releasable) coupling moves from one indexed position to another. In U.S. Pat. No. 5,185,936, the positioning elements on the probe-supporting coupling are forced apart mechanically, and a motor turns a drive dog shaft to index the coupling.

The indexing mechanisms disclosed in U.S. Pat. Nos. 4,313,263, 4,571,847, and 5,185,936. In these products, the z-rail of a machine supports styli and their respective analog or touch trigger probes. Such probes have been held on machines by releasable couplings. Due to the high cost of probes this has been very costly for machines which require the ability to perform diverse tasks. Although it is possible to support analog or touch trigger probes using the apparatus from the coupling of the present invention, it is preferred, for reasons of cost reduction, to use the coupling to connect a stylus to a probe.

Prior indexing couplings have included electrical motors which provide the angular movement for reorientation. Such motors generate heat and thus are a source of errors as they raise the temperature in localized areas of the apparatus, causing distortions which adversely affect the accuracy of any resulting measurements.

The present invention adds significantly to the versatility of a coordinate positioning apparatus in a manner which is convenient, relatively inexpensive, and without impairing the accuracy of the machine.

The present invention provides a coordinate measuring machine in which a stylus is easily and conveniently reoriented and/or removed from the machine. A preferred embodiment of the invention is disclosed in the accompanying drawings and in the following description.

Some existing coordinate measuring machines are provided with indexable analog or touch trigger probes which detect movement of a stylus relative to the probe. In such arrangements, the probes themselves have been indexable, in contrast to preferred embodiments of the present invention in which a stylus is indexable relative to the probe. When interchangeable styli are used in the prior arrangements, interchangeable probes are also required, thus adding to the expense of the apparatus because probes are expensive and multiple probes are required.

In some coordinate measuring machines, storage docks have been provided for interchangeable probes, their styli, and couplings which support the probes. Due to the shapes of these couplings and their storage docks, the couplings require a specific angular orientation in order to fit into a storage dock. These couplings sometimes carry a cluster of styli, some of which encroach into the storage spaces of adjacent storage docks. Such encroachment can be minimized by one feature of the present invention, whereby interchangeable couplings will be accepted by their storage docks at any angle. This permits the preorientation of a coupling at any angle which will minimize potential encroachment by its styli into storage docks which are adjacent to it.

One object of the invention is to provide an effective method of operating a coordinate positioning machine by utilizing an indexing dock with a mechanism and motor which are not incorporated into the probe and stylus assembly, thus simplifying such assemblies and eliminating from them the indexing motor which can create errors due to heat emitted by an indexing motor.

Another object is to reduce the cost of providing a coordinate positioning machine with stylus indexing capabilities, this objective being realized by providing only one indexing dock which can serve multiple probe and stylus assemblies, and by providing indexable couplings between the probes and their styli rather than between the machine head and the probe.

Still another object of the invention is to provide a coordinate positioning machine with a stylus storage system which is effective to store a number of stylus-carrying coupling members at orientations whereby the encroachment of their styli into the storage spaces of adjacent storage docks is reduced or eliminated.

Another object of the invention is to provide for coordinate positioning apparatus in which styli are mounted in a manner which is effective, uncomplicated, indexable, accurate, and/or capable of releasing a stylus when desired.

Other significant objects will be realized by persons familiar with the art, upon reading and understanding this specification.

SUMMARY OF THE INVENTION

In one respect, the invention involves a method for operating a coordinate positioning machine in which a stylus or other workpiece sensing device is connected to a movable member of the machine by a coupling assembly which includes first and second coupling members. The first coupling member is supported by a movable member of the machine, the second coupling member is supported by the first coupling member, and the stylus is supported by the second coupling member. The first and second coupling members respectively have first and second sets of positioning elements which are mutually engagable in a plurality of angular orientations about a coupling axis to provide a plurality of angularly indexed positions at which the second coupling member has stable and repeatable positions relative to the first coupling member. An indexing dock is provided for rotating the second coupling member about the coupling axis. The method involves the steps of moving the movable member of the machine to carry the coupling assembly and stylus or other workpiece sensing device to the indexing dock. The second coupling member is engaged with a rotatable carrier on the indexing dock, preferably after the second coupling member has been entirely disconnected from the first coupling member, and the carrier is rotated to rotate the second coupling member about the coupling axis, thus changing the angular orientation of the second coupling member relative to the first coupling member. The movable member of the machine is then moved to carry the probe and coupling assembly away from the indexing dock for continuing use or to a storage dock.

Another aspect of the invention is the indexing apparatus used for performing the above-mentioned method described above. This involves a coupling assembly which has a first coupling member supported by the movable member of the machine, a second coupling member which is supported by the first coupling member, and a stylus or other workpiece sensing device which is supported by the second coupling member. The coupling assembly has a coupling axis about which the second coupling member is angularly orientable relative to the first coupling member. First and second sets of positioning elements are provided on the first and second coupling members respectively. These sets of positioning elements are mutually engagable in a plurality of angular orientations about the coupling axis to provide a plurality of angularly indexed positions at which the second coupling member has stable and repeatable positions relative to the first coupling member. An indexing dock is used to change the angular orientation of the second coupling member relative to the first coupling member. The indexing dock has a carrier for engaging the second coupling member. The carrier is rotatable about the coupling axis to change the angular orientation of the second coupling member relative to the first coupling member.

To release second coupling member and its stylus thereon at the indexing dock, the invention preferably uses a coupling assembly in which one of the first and second coupling members includes an electromagnet which is normally deactivated when the coupling members are coupled together. The other coupling member has a permanent magnet which provides a magnetic field which attracts the coupling members into mutual contact. The coupling member has positioning elements which provide accurate and repeatable relative positioning between them. The electromagnet, when activated, repels the coupling members apart in order to uncouple the coupling assembly, thus releasing the stylus from the coordinate positioning machine.

To enhance the versatility of the apparatus, styli are mounted on a stylus mount which preferably is an integral part of the second coupling member. The stylus mount has a plurality of stylus-receiving mounting holes, the axes of which extend in different directions from the stylus mount axis and have different inclinations relative to the stylus mount axis.

The machine is preferably operated in a way which permits storage of unused styli and their associated couplings in a plurality of adjacent storage docks, with the coupling members oriented so that their styli do not encroach into the storage spaces of adjacent storage docks. This objective is realized by a coordinate measuring machine in which a movable member is supported and guided for movement along a set of coordinate axes, a releasable coupling is supported by the movable member, and the releasable coupling is releasable from the movable member to permit its replacement by another releasable coupling. A stylus is mounted on the releasable coupling member. The machine has a plurality of mutually adjacent storage docks with storage areas for holding a plurality of releasable coupling members and styli mounted thereon. The machine has means for rotating the releasable coupling member to a selected angle, and the releasable coupling is shaped to fit into a storage dock regardless of the angle selected, so that an angle can be selected to reduce encroachment of styli into the storage areas of adjacent storage docks.

An indexable coupling is preferably integrated between the stylus and an analog or digital probe which is operable to detect movement of the stylus relative to the probe. This is preferable to existing systems in which a movement-detecting probe itself indexable. Thus, according to another aspect of the invention, a coordinate measuring machine has a stylus for contacting a workpiece, and a probe which supports the stylus and is operable to detect movement of the stylus relative to the probe. The machine supports the probe for movement in the coordinate axis system. The stylus is supported from the probe by a coupling assembly which includes first and second coupling members. The first coupling member is supported by the probe, the second coupling member is supported by the first coupling member, and the stylus is supported by the second coupling member. The second coupling member is angularly orientable relative to the first coupling member about a coupling axis of the coupling assembly. The first and second coupling members are provided with first and second sets of positioning elements which are mutually engagable in a plurality of angular orientations about the coupling axis to provide at least twelve angularly indexed positions at which the second coupling member has stable and repeatable positions relative to the first coupling member.

This summary has stated only the primary characteristics the main claims filed with this specification. Other important features of the invention are recited in the dependent claims.

DETAILED DESCRIPTION

Figure 1:
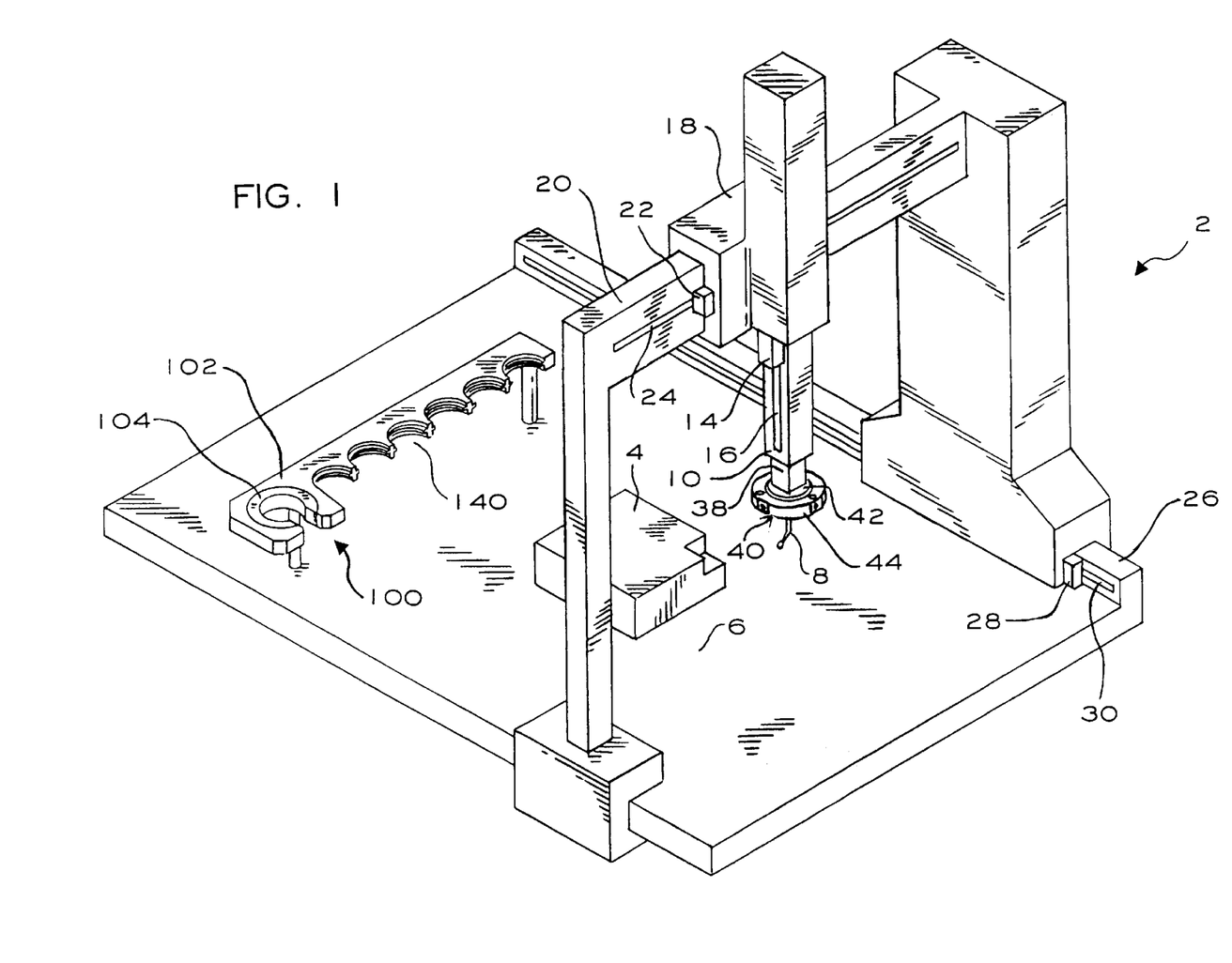
FIG. 1 is a perspective view showing a coordinate positioning apparatus which is operated and constructed in accordance with the invention.

FIG. 1 shows a coordinate measuring machine 2 in which a workpiece 4 is positioned on a supporting surface 6. A stylus 8 is mounted on the machine head, at the lower end of the z-rail 10 of the machine. The location of the machine head in the z-axis direction is provided by a reading head 14 which produces signals indicative of the linear position of the stylus along a scale 16 on the z-rail.

The apparatus has a y-carriage 18 which is movable on bearings along a rail 20 which extends in the y-axis direction. The location along this path of movement is obtained from a reading head 22 which provides output signals indicating the linear position of the carriage along a scale 24 which extends longitudinally of the y-rail 20. This provides data regarding the y-axis position of the upper end of the probe.

X-axis movement of the machine head is guided by a longitudinal guide rail 26 which supports the y-axis rail 20. Positions along the x-axis are obtained from a reading head 28 associated with a stationary x-axis scale 30. A computer or an operator sends instructions to motors which drive the machine in the three mutually perpendicular directions described above. As described thus far, the apparatus is conventional.

The probe is identified by the reference numeral 38. It may be of any type including but not limited to a hard probe, a touch-trigger probe or an analog probe. In a hard probe, the upper and lower ends are rigidly connected together so the hard probe can be an integral and unitary part of the z-rail 10. A touch-trigger probe is one in which a signal is emitted when the tip of the stylus 8 touches and is displaced by contact with the workpiece 4. U.S. Pat. No. 4,153,998 discloses an early touch-trigger probe. An analog probe provides analog signals, the magnitude of which indicate the displacement of the stylus relative to the upper end of the probe, preferably but not necessarily with respect to three mutually perpendicular axes. Probes of the latter type are disclosed in U.S. Pat. No. 5,154,002 and are commercially available under the trademark SCEPTRE from Electronic Measuring Devices, Inc., Budd Lake, N.J. 07828.

The stylus 8 is mounted on the machine by a coupling assembly 40 which is illustrated in greater detail in FIGS. 2 and 7–11. This assembly includes a first or upper member 42 and a second or lower member 44 which is releasably attached to the upper member. The lower coupling member 44 includes a stylus mount 80 with internally threaded holes for receiving the threaded ends of selected styli.

Figure 2:
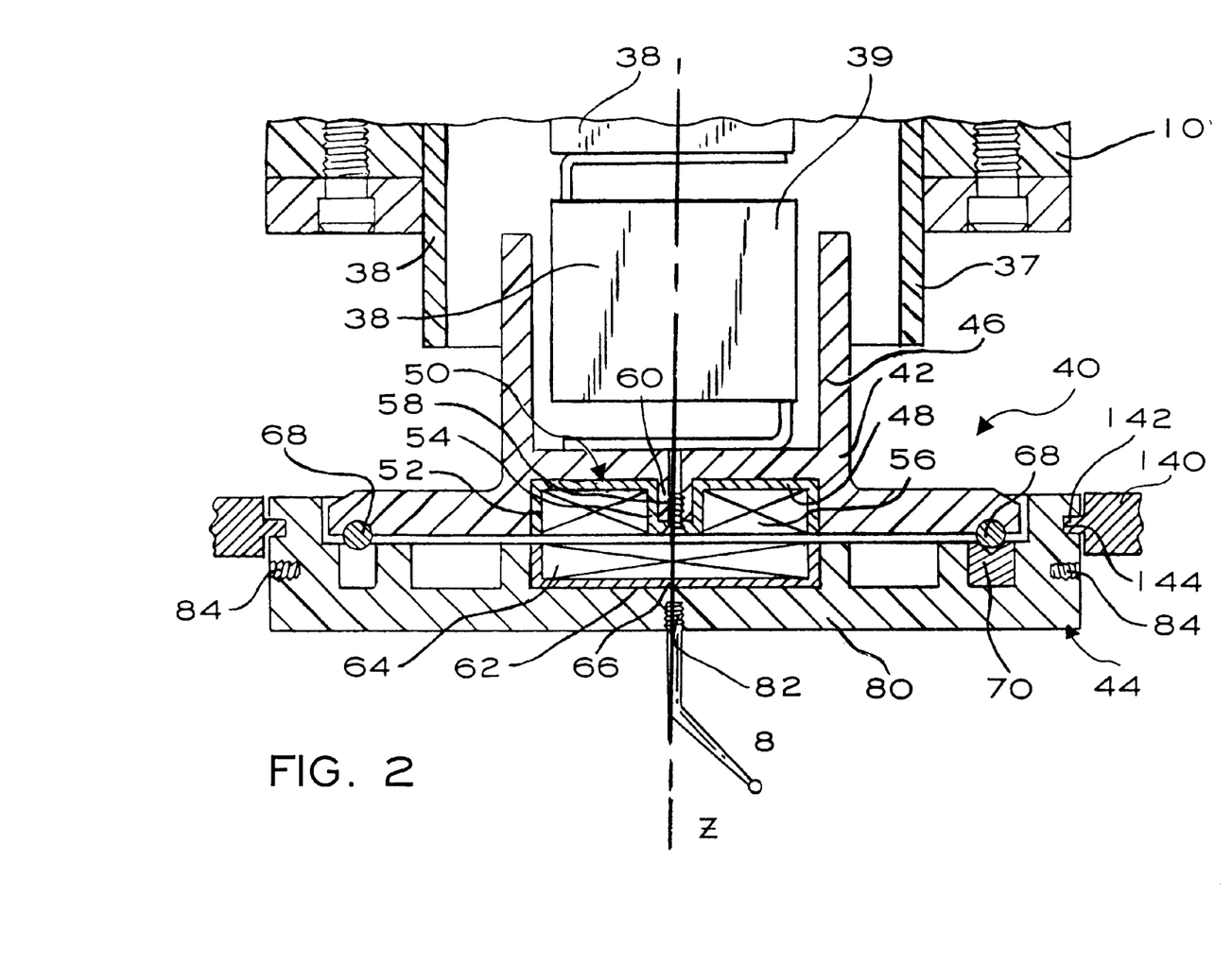
FIG. 2 is a sectional view which includes a lower portion of a probe, a stylus, and a coupling which supports the stylus from the probe, with the lower coupling member docked in a storage dock in preparation for movement of the probe away from the storage dock.
Figure 3:
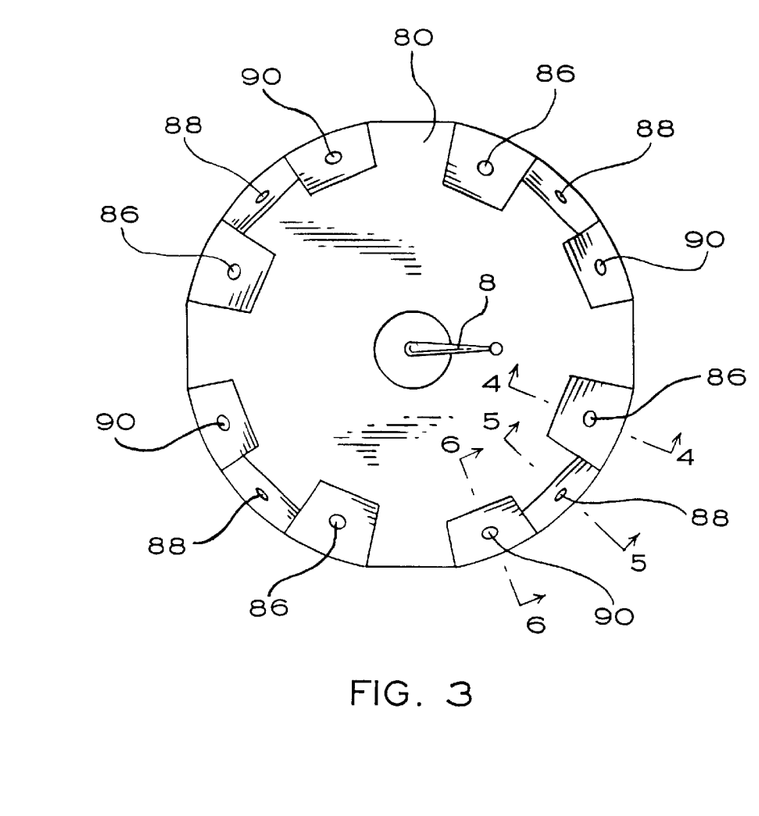
FIG. 3 is a bottom view of the stylus mount on the lower coupling member.

Both coupling members 42 and 44 are made of a non-magnetic material such as aluminum. The upper member 42 has an upwardly facing square socket 46 which receives and is fixed to the lower end of the granite z-rail 10 via the probe 38. As shown in FIG. 2, an analog probe with a light shield 37 is fixed to the Z-axis module 39 of an analog probe which is mounted in a recess formed in the lower end of the z-rail 10.

The upper coupling member 42 has a centrally located circular recess 48 which contains an electromagnet 50. The electromagnet includes a steel cup 52 with an integral core 54 surrounded by a wire coil 56. A screw 58 threaded into a boss 60 secures the electromagnet on the upper coupling member 42.

The lower coupling member 44 has, in its upper surface, a centrally located circular recess 62 which contains a high strength permanent magnet 64 in a steel cup 66.

It will be understood that the permanent magnet 64 in the lower coupling member 44 will magnetically attract the steel cup 52 and core 54 of the electromagnet 50 on the upper coupling member 42, thus attracting the lower coupling member 44 into firm contact with the upper coupling member 42.

Figures 7, 8, 9:
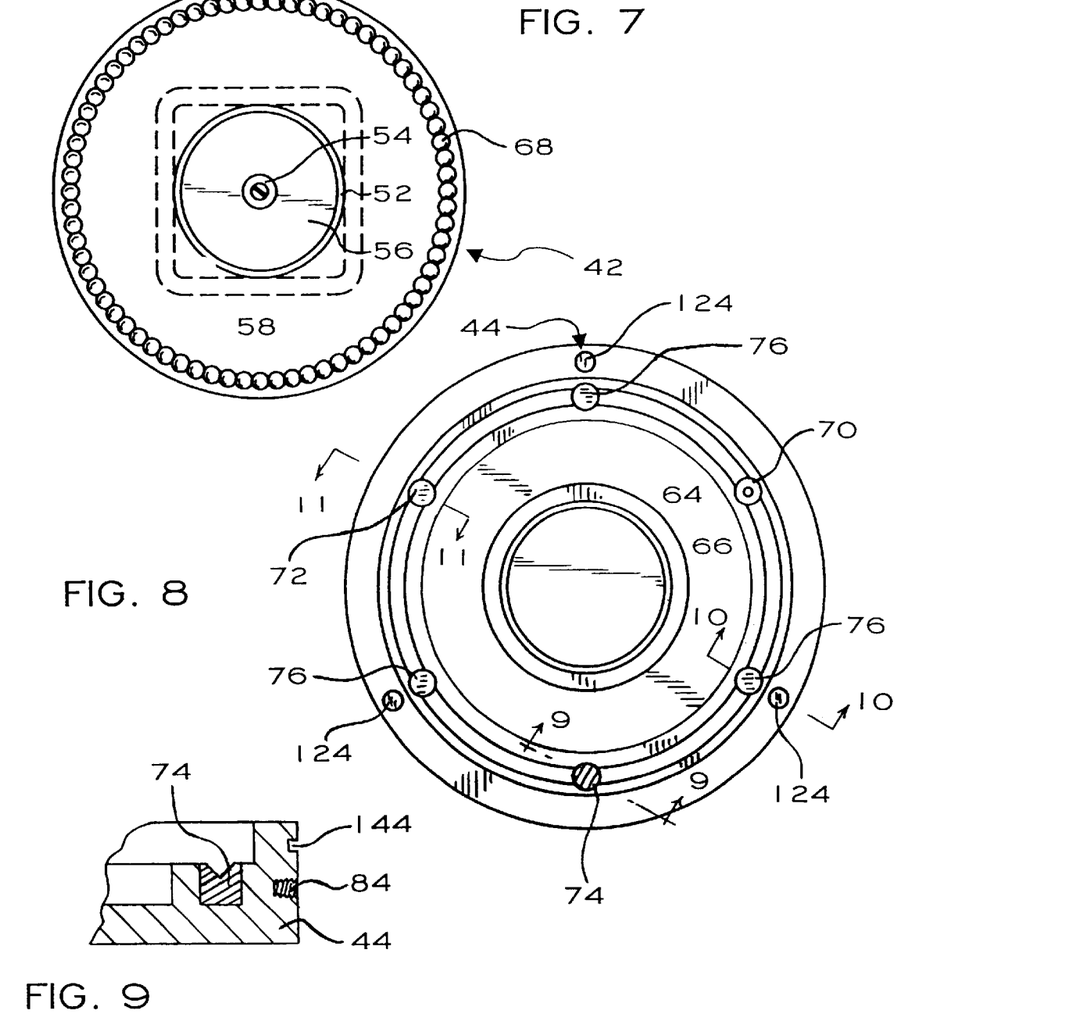
FIG. 7 is a bottom view of the upper coupling member.
FIG. 8 is a top view of the lower coupling member.
FIGS. 9, 10 and 11 are partial sectional views of the lower coupling member as seen along the section lines 9—9, 10—10 and 11—11 in FIG. 8.

In order to provide accurate and repeatable relative positioning between the coupling members 42 and 44 when they are held together by the permanent magnet 64, a modified Kelvin coupling is preferably utilized. As is known in the art, a Kelvin coupling includes three balls on one member which engage three positioning elements on another member. The Kelvin coupling disclosed in this specification has seventy-two balls 68, spaced apart at 5° increments. They are bonded in hemispherical pockets in the bottom wall of the upper coupling member 42. The exposed spherical surfaces of three of these balls engage three upwardly facing seats 70, 72 and 74 which are 1200 apart in the lower coupling member 44. Seat 70 has a conical internal surface, seat 72 is flat, and seat 74 has a v-shaped groove, the longitudinal axis of which is directed toward the central axis of seat 70 as shown in FIG. 8.

As is known in the art, such a Kelvin coupling with three balls on one member which respectively engage conical, flat, and v-groove surfaces on another member is highly effective for providing accurate and repeatable relative positioning between the members.

Figure 10:
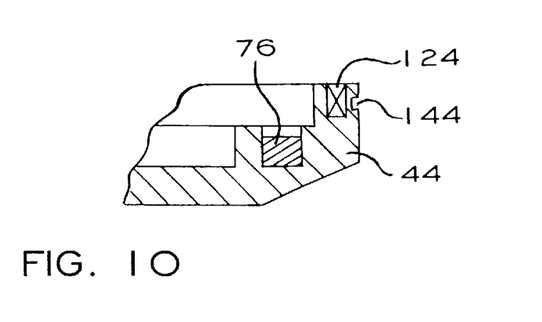
Figure 11:
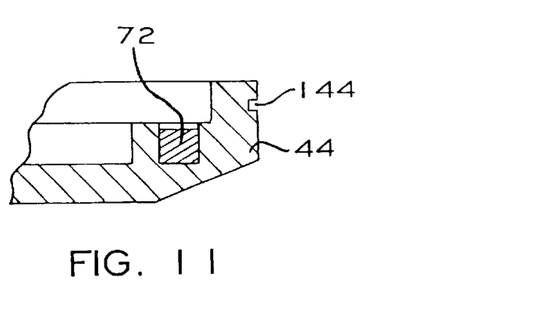

For purposes of stabilizing the lower coupling member in case it becomes deformed between any two seats 70, 72, 74, the lower coupling member 44 has three supplemental seats 76. These seats are flat, they each directly face one of the balls 68, and, as shown in FIGS. 10 and 11, they each are slightly below the height of flat seat 72 so that there will be a small clearance between the seats 76 and the balls which face them. These supplemental seats 76 come into play only when the upper coupling member is deformed between the seats 70, 72 and 74, and a supplemental seat 76 is contacted by its respective ball to limit further deformation.

As explained above, during normal use of the apparatus, the permanent magnet 64 on the lower coupling member 44 causes contact between the upper and lower members 42 and 44 by means of the Kelvin coupling. When a stylus change is needed, the lower coupling member 44 can be ejected from the upper member by connecting the electromagnet coil 56 to opposite poles of a source of direct current. This energizes the electromagnet and produces a magnetic field with a polarity which repels the lower coupling member 44 away from the upper coupling member 42. The repulsive force is equal to or greater than the attractive force attributable to the permanent magnet 64.

Figure 4:
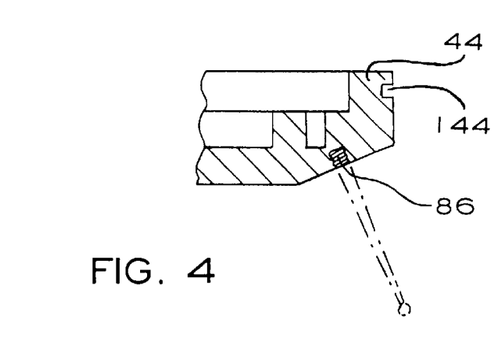
FIGS. 4, 5 and 6 are partial sectional views of the stylus mount as seen along the section lines 4—4, 5—5 and 6—6 in FIG. 3.
Figure 5:
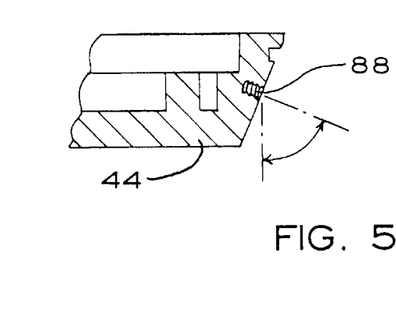
Figure 6:
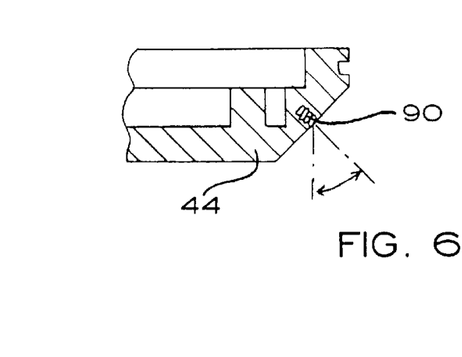

A preferred stylus mount 80 facilitates the mounting of styli at many different orientations. As shown in FIGS. 2–6, the stylus mount 80 has seventeen stylus-receiving threaded holes which extend away from the coupling axis z-z in different directions and have different inclinations relative to the coupling axis. One hole 82 is parallel to and coincident with the coupling axis, and four mutually perpendicular holes 84 are perpendicular to the coupling axis. Twelve holes 86, 88 and 90 lie at acute angles to the coupling axis and extend in twelve different directions. Four of these holes 86 in mutually perpendicular planes are inclined 22.5° from the axis as shown in FIG. 4, four holes 88 in mutually perpendicular planes are inclined 67.5° relative to the coupling axis as shown in FIG. 5, and four holes 90 in mutually perpendicular planes are inclined 45° relative to the coupling axis as shown in FIG. 6. Fewer holes may be provided, but preferably there are holes which extend in at least four directions from the coupling axis and are oriented in at least three different inclinations relative to the coupling axis.

In the preferred embodiment of the invention and as will be described in greater detail below, the lower coupling member 44 is released from the upper coupling member 42 and supported by magnets on the lower surface of a docking carrier which is then rotated to move the coupling member 44 to the desired angular orientation. The reoriented lower coupling member 44 is released from the docking carrier and recoupled to the upper coupling member 42.

An indexing dock for rotating the lower coupling member 44 to index it is shown at 100 in FIGS. 12–15. It has a base 102 and a turntable-like carrier 104 which is supported on and is rotatable with respect to the base 102.

Figures 12, 13:
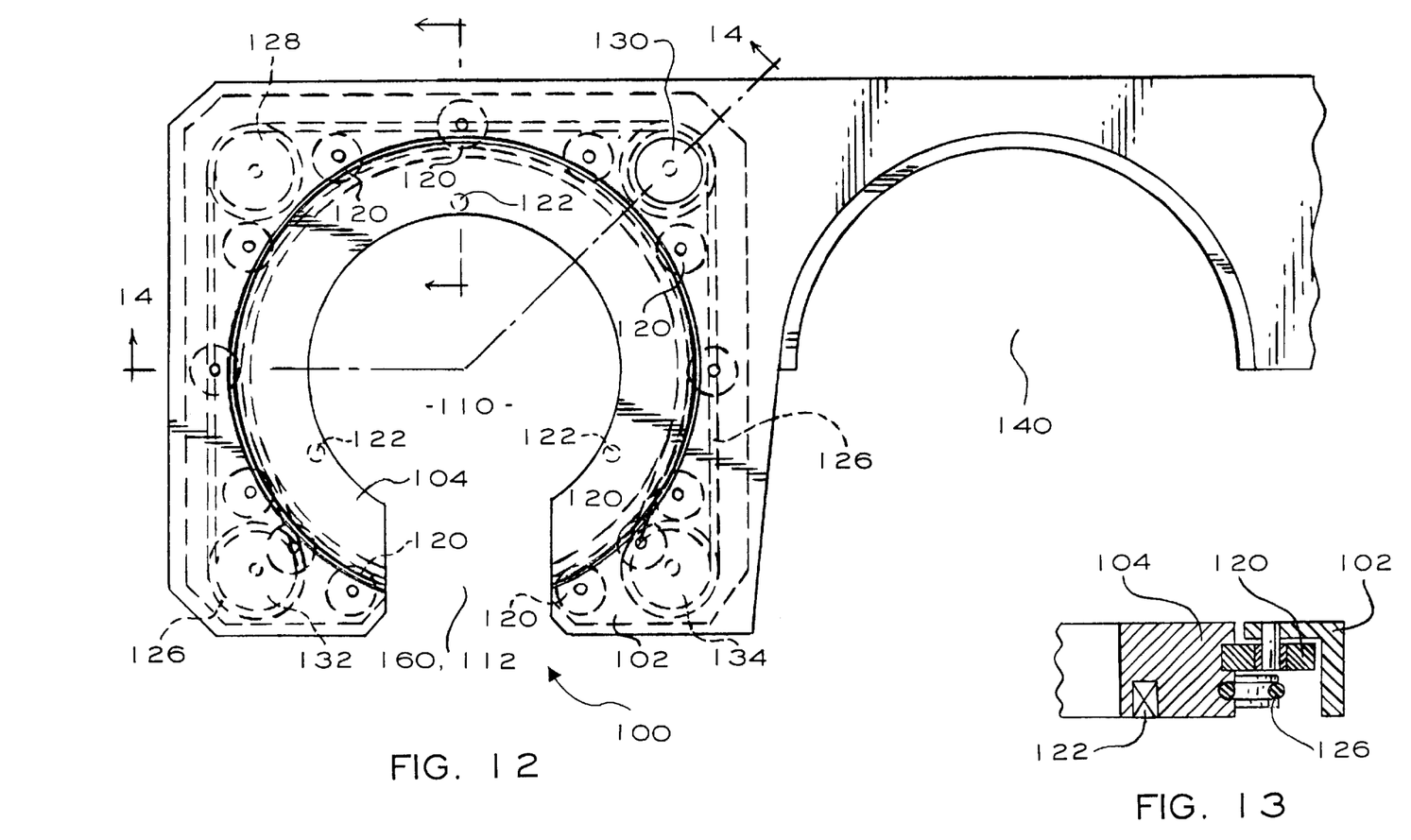
FIG. 12 is a top view of a docking unit which includes an indexing dock and a storage dock constructed and operated in accordance with the invention.
FIG. 13 is a partial sectional view of the indexing dock as seen along the section line 13—13 in FIG. 12.

The base 102 has an entrance passage 106 which leads to a circular opening, the center of which is coincident with the releasable axis of the coupling 40 when the indexing dock is in operation. The carrier 104 is C-shaped and it is located in the circular opening of the base 102. It has a central docking opening 110 which is located in and is concentric with the circular opening in the base 102, an entrance passage 112 which leads to the docking opening 110, and an outer perimeter which is concentric with and spaced closely to the edge of the circular opening in the base 102. The outer edge surface of the carrier 104 has upper and lower grooves 116 and 118 which are used to support and rotate the carrier 104 as will be described below.

As shown in FIG. 12, the base has a set of thirteen carrier support wheels 120, portions of which project inwardly from the base into the carrier groove 116, thus supporting the carrier 104 for rotation on the base and maintaining the carrier in a substantially concentric relation relative to the opening in the base 102.

Three small magnets 122 are used to support the lower coupling member 44 at an angularly aligned position on the carrier 104. These magnets 122 are on the lower side of the carrier, spaced 120° apart as shown in broken lines in FIG. 12, and they are alignable with three corresponding steel inserts 124 (FIGS. 8 and 10) which are screwed into the upper surface of the lower coupling member 44. In addition to their coupling-supporting function, the magnets 122 and inserts 124 act as alignment elements in the respect that they establish a predetermined angular orientation of the lower coupling member 44 and the carrier 104 about the coupling axis. There are only three such predetermined orientations due to the sizes and spacings of these elements 122 and 124.

Figure 14:
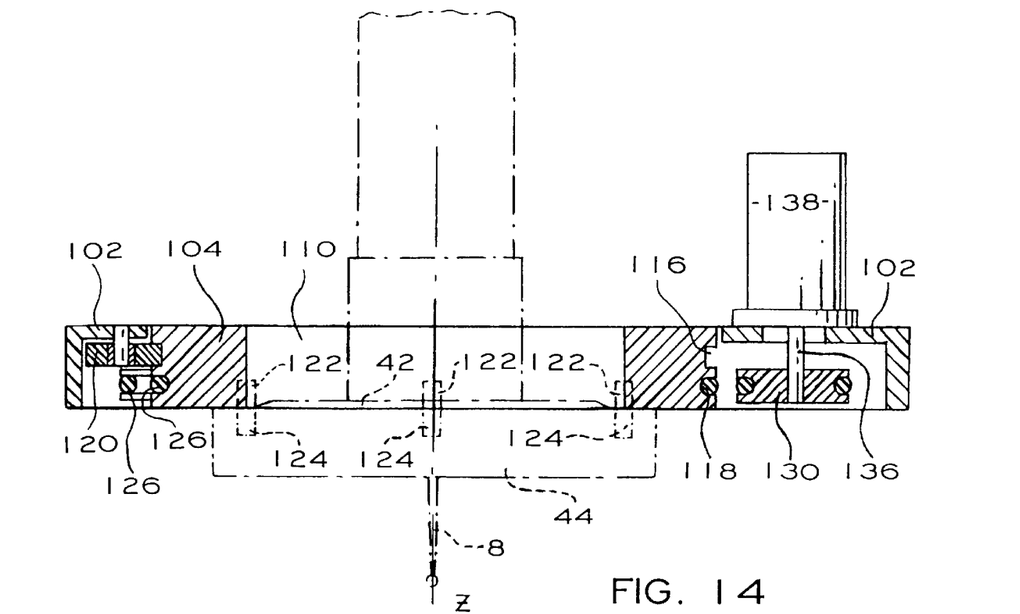
FIG. 14 is a sectional view of the indexing dock as seen along the section line 14—14 in FIG. 12, with a broken line indication of the locations of the upper and lower coupling members at the moment when the lower coupling member is being transferred to the indexing dock.
Figure 15:
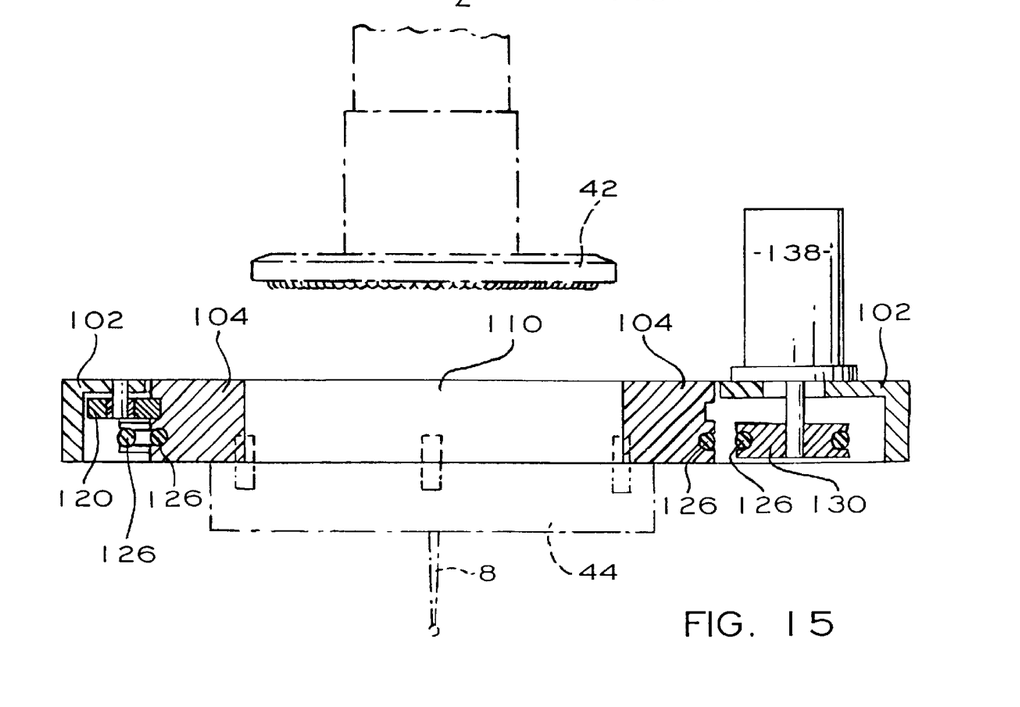
FIG. 15 is a sectional view similar to FIG. 14, but showing the components after the lower coupling member has been transferred to the rotatable carrier of the indexing dock.

The carrier 104 is rotated by a drive belt 126 which is seated in the lower groove 118 of the carrier as shown in FIGS. 13–15. The belt 126 travels along the groove 118 and it is guided by four pulleys 128, 130, 132 and 134 as shown in FIG. 12. Pulley 130, a drive pulley, is fixed to the shaft 136 of a reversible stepping, motor 138 which is mounted on the upper surface of the base 102. Actuation of the motor 138 will drive the belt 126 which, in turn, will rotate the carrier 104 and a coupling member 44 which is supported on the carrier.

In the normal course of operation, a machine will have many different styli which are mounted individually on several interchangeable lower coupling members 44. The stylus in use and its respective coupling member 44 are coupled to the upper coupling member 42 as shown in FIG. 1, and the idle coupling members 44 with their styli are held in the storage docks 140 (FIGS. 1 and 4). As shown in FIG. 4, these docks have tongues 142 which engage grooves 144 formed in the substantially circular perimeters of the coupling members 44.

Figures 16A, 16B, 16E, 16F:
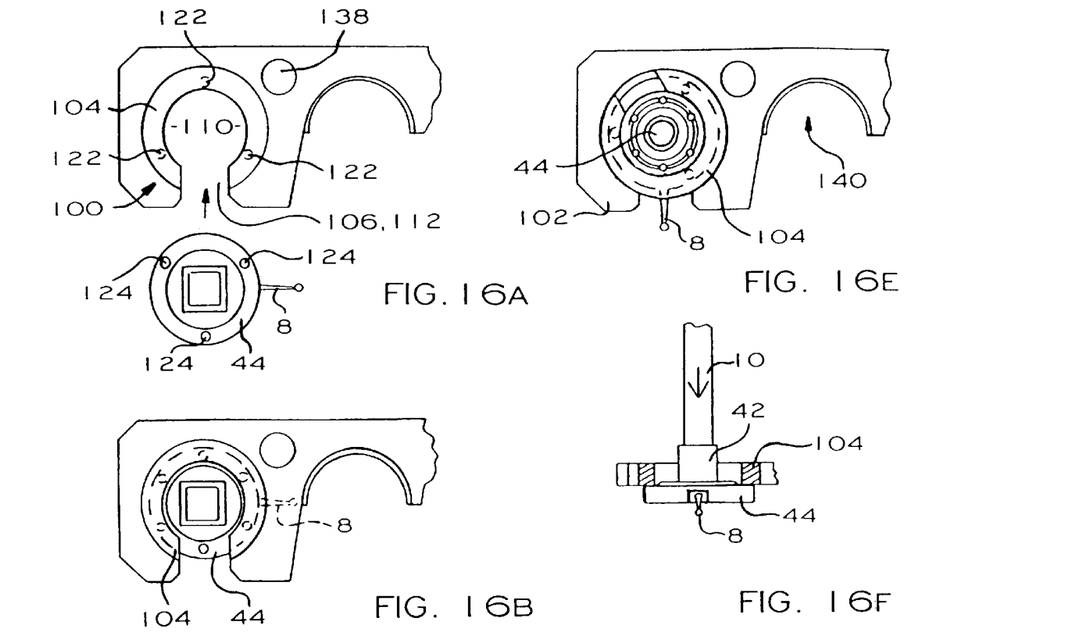
FIGS. 16A–16H illustrate schematically the steps of the method according to the invention, during which a lower coupling member and its stylus are angularly reoriented relative to the upper coupling member.
Figure 16C:
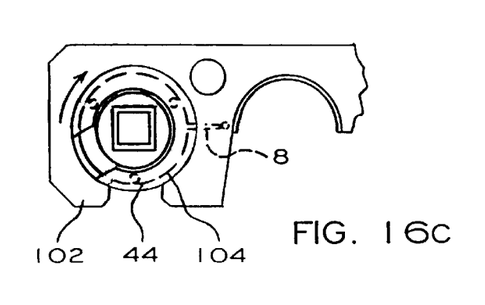
Figure 16D:
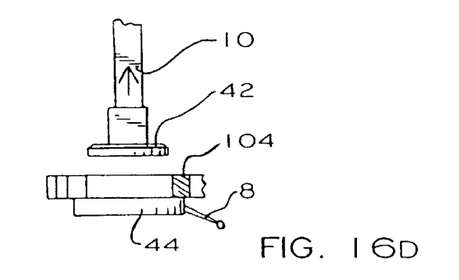

In order to change the angular orientation of a coupling member 44 and its stylus or styli relative to the coupling axis z-z, the machine performs a sequence of steps illustrated in FIGS. 16A–16H. As can be seen in FIG. 16A, the machine carries the releasable coupling 44 to the indexing dock 100. The coupling assembly or the probe above it moves through the aligned entrance passages 106 and 112 and to the position shown in FIG. 16B where the coupling axis coincides with the central axis of the carrier 104. At this point, the steel inserts 124 on the lower coupling member 42 are not aligned with the pickup magnets 122 on the carrier 104, so it is necessary to rotate the carrier as shown in FIG. 16C until the elements 122 and 124 are aligned at the predetermined pickup angle. In the illustrated example, this rotation is about 60° in a clockwise direction. Then, the z-rail 10 is raised to elevate the upper coupling member as shown in FIG. 16D. During this movement, the electromagnet 50 is energized when the lower coupling member 44 contacts the carrier 104, thus facilitating the release of the lower coupling member from the upper coupling member 42 and leaving the lower coupling member magnetically suspended from the magnets 122 on the lower surface of the carrier 104.

Figure 16G:
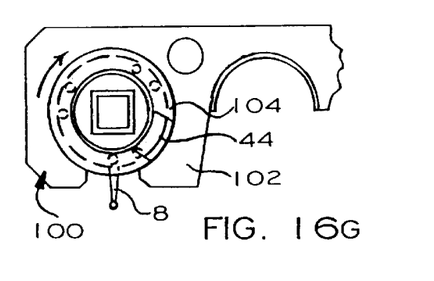
Figure 16H:
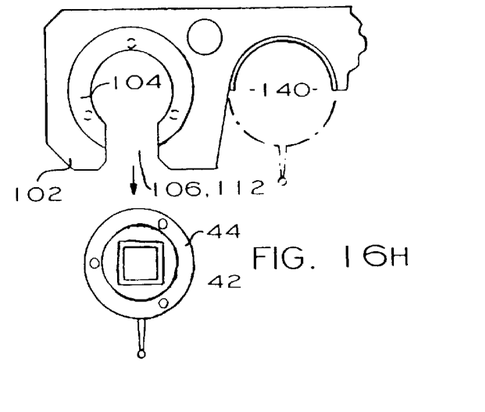

The computer which controls the machine then sends signals to the motor 138 of the indexing dock, instructing it to rotate the carrier 104 until the lower coupling member 44 is at the angular orientation which is desired for the succeeding operation of the machine, or for storage. This step is shown in FIG. 16E where the carrier 104 and coupling member 44 are rotated 90° in a clockwise direction. The upper coupling member 42 is then moved down as shown in FIG. 16F until it engages the reoriented lower coupling member 44. The permanent magnet 64 in the upper coupling member holds the coupling members 42 and 44 together at a stable indexed position established by the positioning elements. The continuation of this downward movement (not shown) moves the lower coupling member off of the carrier 104. At this point in time, the coupling cannot leave the indexing dock 100 because the entrance passageway 106 in the base 102 of the indexing dock is obstructed by the carrier 104. To open the entrance passageway 106, the carrier 104 is rotated 210° in a clockwise direction as shown in FIG. 16G until it arrives at the position shown in FIG. 16H where the entrance passageway 112 in the carrier 104 coincides with the entrance passageway 106 in the base of the dock 100. The computer or an operator then instructs the machine to move the coupling away from the dock, and it does so as shown in FIG. 16H. Workpiece analysis may then resume with the stylus being supported at its new orientation.

In addition to rotating a lower coupling member to an indexed orientation for purposes of machine operation, the indexing dock 100 is also useful for rotating a lower coupling member to an angle which facilitates its storage. By way of background, a plurality of storage docks 140 are adjacent to each other as shown in FIG. 1. In prior systems, probes stored in one storage dock have had styli which projected into the storage spaces of adjacent storage docks, thus interfering with the orderly storage of the probes and their respective styli. Prior probe storage docks have been configured to accept probes only at certain orientations, thus complicating the situation. Due to the substantially circular shape of the lower coupling members 44 according to the present invention and the corresponding semi-circular shape of the storage docks 140, the couplings will fit into the storage docks at any angle. Thus, a coupling 44 can be preoriented by the indexing dock 100 at any angle which will minimize potential encroachment by its styli into storage docks which will lie adjacent to it. By way of example, a stylus indexed to the position shown in FIG. 16A, if moved to a storage dock, would encroach into the storage area of an adjacent storage dock. By indexing the stylus to the orientation shown in FIG. 16H, such encroachment is avoided. This is shown by the broken line outline of the coupling and stylus in the storage dock 140 in FIG. 16H.

Figure 17:
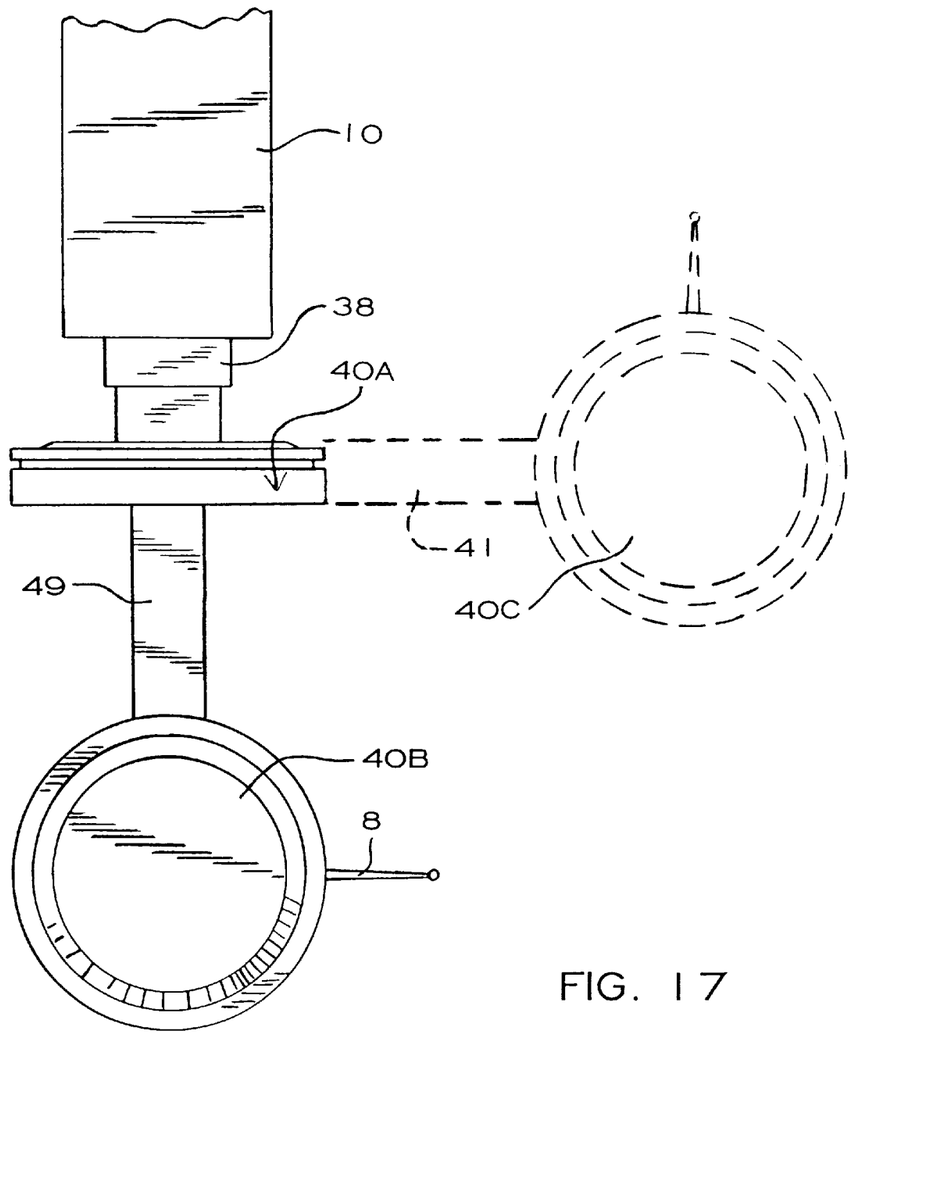
FIG. 17 is a diagrammatic view showing an embodiment of the invention in which two coupling assemblies are utilized, one of which is supported on the other.

FIG. 17 shows an embodiment of the invention in which two couplings 40A and 40B are utilized to support a stylus. Coupling 40A is substantially the same as the coupling shown in FIG. 2, but it carries a bar 49 rather than a stylus. The lower end of the bar 49 is connected to a second coupling 40B which includes coupling members which are constructed and operated in the same manner as the coupling members 42 and 44. A stylus 8 is mounted on the element in coupling 40B which corresponds to element 44 in FIG. 2. Indexing of coupling 40B is performed by an indexing dock which has its axis coincident with the axis of coupling 40B.

A further alternative is indicated by the broken line representation of a coupling assembly 40C in FIG. 17. This coupling, which is used in lieu of the coupling assembly 40B, is mounted on the lower member of coupling 40A by a bar 41.

From the foregoing, it will be appreciated by those skilled in the art that the present invention provides a very effective way of mounting a stylus. Such an arrangement has many benefits, both in simple manually operated coordinate measuring machines, and in computer-controlled machines which automatically move the probe to stations where numerous styli are stored, picked up, and dropped off.

This specification has described only one embodiment of the invention. The invention embraces modifications and variations including improvements based on existing and future technologies. By way of example, the kinematic coupling may be formed of various other components, including bars, cylinders, grooves and other arrangements rather than the preferred Kelvin coupling. The coupling axis can be non-vertical. The lower coupling can be supported above or below the carrier by devices such as snaps, sockets, bayonet connections, adhesion or other means. The carrier may be rotated by a variety of mechanisms including gears, ratchets, electromechanical devices, etc. The coordinate measuring machine may have only two mutually perpendicular linear axes or it may use non-orthogonal coordinate systems. In view of the many forms the invention may take, it is emphasized that the invention is not limited to the disclosed embodiment.

I claim:

1. A method of operating a coordinate positioning machine in which a workpiece sensing device is connected to a movable member of the machine by a coupling assembly which includes a first coupling member and a second coupling member, said first coupling member being supported by said movable member of the machine, said second coupling member being supported by said first coupling member, said workpiece sensing device being supported by said second coupling member, said first and second coupling members respectively having first and second sets of positioning elements which are mutually engagable in a plurality of angular orientations about a coupling axis to provide a plurality of angularly indexed positions at which the second coupling member has stable and repeatable positions relative to said first coupling member, said machine having an indexing dock for rotating said second coupling member about said coupling axis, said method including the following steps:

a) moving said movable member of the machine to carry said coupling assembly and workpiece sensing device to said indexing dock;

b) engaging said second coupling member with a rotatable carrier on said indexing dock;

c) moving said rotatable carrier to rotate said second coupling member about said coupling axis to change the angular orientation of said second coupling member relative to said first coupling member; and, d) moving said movable member to carry said probe and coupling assembly away from said indexing dock.

2. The method according to claim 1 including the steps of releasing said second coupling member from the first coupling member before the second coupling member is rotated, and recoupling said second coupling member to said first coupling member before the coupling assembly is carried away from the dock.

3. The method according to claim 1 wherein the indexing dock has a docking opening and an entrance passage which leads into said docking opening, said method including the step of moving said axis through said entrance passage and into said docking opening and then releasing the second coupling member from the first coupling member.

4. The method according to claim 3 including the step of closing the entrance passage by rotating said second coupling member about said axis.

5. The method according to claim 1 including the step of turning the indexing dock to a predetermined angular orientation relative to the second coupling member before the second coupling member is engaged by said indexing dock, said second coupling member being in said predetermined angular orientation relative to said indexing dock when said second coupling member is rotated by said indexing dock.

6. The method according to claim 1 wherein one of said coupling members includes a permanent magnet, said method including the step of coupling said second coupling member to said first coupling member by attracting said coupling members together by magnetic fields emanating from said permanent magnet.

7. The method according to claim 1 wherein one of said coupling members includes an electromagnet, said method including the step of releasing said second coupling member from said first coupling member by actuating said electromagnet to repel said coupling members apart.

8. The method according to claim 7 wherein one of said coupling members includes a permanent magnet, said method including the step of coupling said second coupling member to said first coupling member by attracting said coupling members together by magnetic fields emanating from said permanent magnet.

9. The method according to claim 1 in which the coordinate positioning machine has a plurality of adjacent storage docks with storage areas for storing a plurality of said second coupling members with styli attached thereto, said second coupling member having a shape which fits into said storage docks regardless of the angular orientation of the second coupling member about said coupling axis, said method including the steps of changing the angular orientation of said second coupling member during step (c) to an orientation which will reduce encroachment of said styli on said second coupling member into the storage areas of the storage docks which are adjacent to one said storage dock, and moving said movable member after step (d) to carry the second coupling member of the coupling assembly to said one storage dock.

10. The method according to claim 1 in which, prior to step (a), a plurality of styli are connected to said second coupling member in mounting holes which extend in different directions from said coupling axis and are oriented at different inclinations from said coupling axis.

11. The method according to claim 1 wherein a probe is supported by the movable member and said method includes the step of supporting the stylus from a probe which includes a detector for detecting movement of the stylus relative to the probe, and changing the angular orientation of said probe during step (c) to one of at least twelve said angularly indexed positions.

12. The method according to claim 1 wherein said workpiece sensing device is a stylus, said movable member includes a probe which detects movement of the stylus relative to the probe, and said coupling assembly supports the stylus from the probe, said stylus being rotated relative to the probe during step (c).

13. A coordinate positioning machine, comprising,
a movable member which is supported and guided for movement along a set of coordinate axes;
a releasable coupling member which is supported by said movable member and is releasable therefrom to permit its replacement by another releasable coupling member;
a stylus mounted on said releasable coupling member;
a plurality of storage docks with storage areas for storing a plurality of said releasable coupling members and styli mounted thereon. said storage docks being adjacent to each other;
means for rotating to a selected angle said releasable coupling member while in a released state from said movable member;
said releasable coupling member having a shape which fits into its said storage dock regardless of the angle selected, whereby an angle can be selected to reduce encroachment of styli on said releasable coupling into the storage areas of adjacent storage docks.

14. A coordinate measuring machine according to claim 13 wherein the releasable coupling has a substantially circular shape which engages said storage dock.

15. A coordinate positioning machine, comprising:
a storage dock assembly including storage docks;
an indexing apparatus for orienting a workpiece sensing device relative to a movable member of the coordinate positioning machine, said indexing apparatus including,
a coupling assembly for supporting the workpiece sensing device from the movable member of the machine, said coupling assembly including first and second coupling members, said first coupling member being supported by the movable member of the machine, said second coupling member being supported by said first coupling member, said workpiece sensing device being supported by said second coupling member, said coupling assembly having a coupling axis about which the second coupling member is angularly orientable relative to said first coupling member,
first and second sets of positioning elements provided on said first and second coupling members respectively, said sets of positioning elements being mutually engageable in a plurality of angular orientations about said coupling axis to provide a plurality of angularly indexed positions at which the second coupling member has stable and repeatable positions relative to said first coupling member, and
said storage dock assembly including an indexing dock for changing the angular orientation of the second coupling member relative to the first coupling member, said movable member of the machine being operable to carry the coupling assembly to the indexing dock, said indexing dock including a carrier for engaging the second coupling member, said carrier being rotatable about said coupling axis to change the angular orientation of said second coupling member relative to the first coupling member.

16. The coordinate positioning machine of claim 15 wherein said indexing dock includes a base member, said carrier being rotatably mounted on said base member.

17. The coordinate positioning machine of claim 15 wherein the carrier has a docking opening through which said coupling axis extends when said second coupling member is supported by said carrier, said carrier having an entrance passage which leads into said docking opening.

18. The coordinate positioning machine of claim 17 wherein said carrier is mounted on a base member which has an entrance passage, said entrance passage of said base member being alignable with said entrance passage of said carrier to permit movement of components about said coupling axis into said docking opening, said carrier, when rotated relative to the base member, opening and closing the entrance passage of said base member.

19. The coordinate positioning machine of claim 15 wherein said coupling assembly is a releasable coupling assembly which includes a permanent magnet mounted on one said coupling member and an electromagnet mounted on the other said coupling member, said permanent magnet biasing said coupling members together, said electromagnet when activated repelling said coupling members apart to uncouple said coupling assembly.

20. The coordinate positioning machine of claim 15, including mutually engageable sets of alignment elements on said carrier and said second coupling member to establish a predetermined angular orientation about said coupling axis of said second coupling member relative to said carrier.

21. The coordinate positioning machine of claim 20, wherein said alignment elements include magnets.

22. The coordinate positioning machine of claim 15, including drive means for rotating said carrier, said drive means being operable when said second coupling member is in said indexing dock to turn said carrier about said coupling axis to a pickup position where the second coupling member is at said predetermined angular orientation relative to said carrier.

23. The coordinate positioning machine of claim 15, wherein the carrier has a docking opening through which said coupling axis extends when said second coupling member is supported by said carrier, said carrier having an entrance passage which leads into said docking opening, said carrier being mounted on a base member which has an entrance passage, said entrance passage of said base member being alignable with said entrance passage of said carrier to permit movement of components on said coupling axis into said docking opening; said carrier being movable to a position where it obstructs said entrance passage of the base member.

24. The coordinate positioning machine of claim 15, wherein one set of positioning elements has spherical surfaces and the other set of positioning elements includes seats which are engaged by said spherical surfaces.

25. The coordinate positioning machine of claim 24, wherein one said seat is a conical recess, one said seat is a groove, and one said seat is flat.

26. The coordinate positioning machine of claim 25, wherein there are more spherical surfaces than seats.

27. The coordinate positioning machine of claim 15, wherein said movable member is supported and guided for movement along a set of coordinate axes.

28. The coordinate positioning machine of claim 15, further comprising an x-axis member which is guided for linear movement along an x-axis, a y-axis member which is supported on the x-axis member and is guided for linear movement along a y-axis which is perpendicular to the x-axis, and a z-axis member which is mounted on the y-axis member and is guided for linear movement along a z-axis which is perpendicular to the x-axis and the y-axis, said movable member being said z-axis member.

29. The coordinate positioning machine of claim 15, wherein said second coupling member includes a stylus mount, said stylus mount having a stylus mount axis and being provided with a plurality of stylus-receiving mounting holes, said mounting holes having axes which extend in different directions from said stylus mount axis and have different inclinations relative to said stylus mount axis.

30. The coordinate positioning machine of claim 29 in which the axes of said mounting holes extend away from said stylus mount axis in at least four different directions and are oriented in at least three different inclinations relative to said stylus mount axis.

31. The coordinate positioning machine of claim 15, wherein said workpiece sensing device is a stylus, said movable member includes a probe which detects movement of the stylus relative to the probe, and said coupling assembly supports the stylus from the probe.

32. The coordinate positioning machine of claim 15, wherein said plurality of storage docks include storage areas for storing a plurality of said second coupling members with workpiece sensing devices mounted thereon, said storage docks being adjacent to each other, said second coupling member having a shape which fits into a said storage dock regardless of its angular orientation, whereby said second coupling member can be oriented at an angle which avoids encroachment of its workpiece sensing device into the storage areas of adjacent storage docks.

33. The coordinate positioning machine of claim 15, wherein said coupling assembly is a releasable coupling assembly in which said second coupling member is separable from said first coupling member.

* * * * *